United States Patent [19]

Smith

[11] 3,972,503

[45] Aug. 3, 1976

[54] SERVO PRESSURE OPERATED PISTON ARRANGEMENTS

[75] Inventor: Trevor Stanley Smith, Sutton, England

[73] Assignee: Lucas Industries Limited, Birmingham, England

[22] Filed: Aug. 19, 1975

[21] Appl. No.: 605,929

[30] Foreign Application Priority Data

Oct. 31, 1974 United Kingdom............... 47284/74

[52] U.S. Cl........................................ 251/30; 91/49; 91/461; 251/44

[51] Int. Cl.[2]........................................... F16K 31/02

[58] Field of Search.................. 91/461, 49; 251/30, 251/43, 44

[56] References Cited

UNITED STATES PATENTS

| | | | |
|---|---|---|---|
| 3,105,671 | 10/1963 | Teitelbaum et al. | 251/30 |
| 3,934,816 | 1/1976 | Terrell et al. | 251/44 X |

*Primary Examiner*—Arnold Rosenthal

[57] ABSTRACT

A servo-pressure operated piston arrangement includes a pilot valve which is movable by a torque motor against a biasing spring. A closed chamber is defined between one end of the piston and its surrounding cylinder, and this chamber communicates with an orifice which is shut by the pilot valve, under control of the biasing spring, to lock the piston relative to the cylinder if the torque motor fails.

7 Claims, 1 Drawing Figure

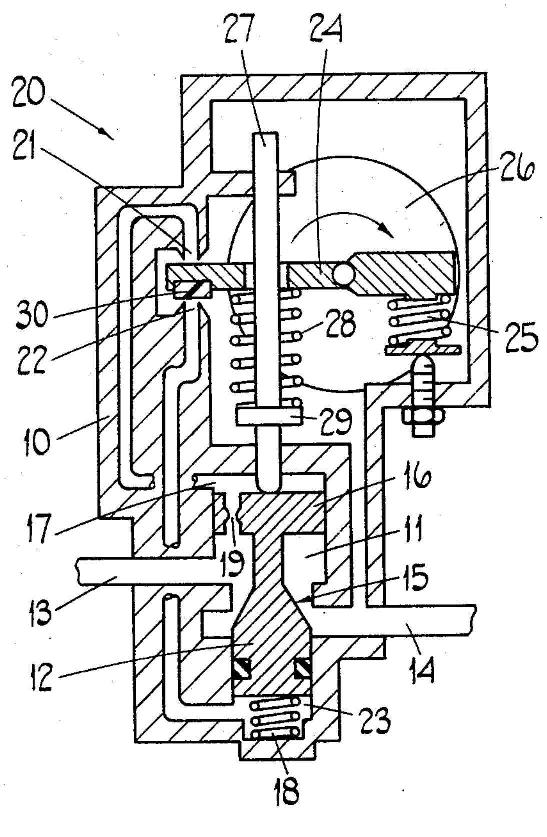
27
24
20
21
26
30
28
25
22
29
10
16
17
11
19
15
13
14
12
23
18

SERVO PRESSURE OPERATED PISTON ARRANGEMENTS

This invention relates to servo-pressure operated piston arrangement wherein a piston member is movable in response to variation in a servo-pressure signal whose magnitude is controlled by a torque motor operated pilot valve.

It is frequently required that in the event of failure of the torque motor, or of an input signal thereto, the piston element shall be held stationary in substantially the position which it occupied when this failure occurred.

It is an object of the present invention to provide a servo-operated piston arrangement of the foregoing kind, in which a piston element is restrained against movement in the event of malfunction of the torque motor.

According to the invention a servo-pressure operated piston arrangement comprises a piston member slidable within a cylinder in response to variations in servo-pressure signal, a pilot valve for controlling said servo-pressure signal, said pilot valve comprising a torque motor, a first orifice, a control member movable by said torque motor to vary fluid flow through said first orifice, first biasing means urging said control member against movement by said torque motor, and a second orifice, said second orifice communicating with a chamber defined, in part, by opposing axially - directed faces on said piston member and said cylinder, said first biasing means urging said control member in a direction to shut said second orifice.

An example of the invention will now be described with reference to the accompanying drawing, which shows a fluid flow control valve incorporating a servo-pressure operated piston arrangement.

The valve shown has a body 10 within which is a stepped bore 11 in which a stepped piston member 12 is slidable. Passages 13, 14 open into the bore 11 and respectively define an inlet and an outlet for the valve. A tapered portion 15 of the piston member 12 co-operates with passage 14 to control fluid flow therethrough.

Piston member 12 has a head 16 which defines a chamber 17 within the bore 11, the piston member 12 being movable against a spring 18 by an increase in a servo-pressure signal in the chamber 17. Chamber 17 communicates with passage 13 via a restrictor 19.

A pilot valve, indicated generally at 20, has a pair of axially aligned orifices 21, 22. Orifice 21 communicates with chamber 17, and orifice 22 communicates with a further chamber 23 which is defined between an end of piston member 12 and an opposing end face of the bore 11. Valve 20 has a lever control member 24 which is pivotally movable against a biasing spring 25, by a torque motor 26, in a direction to reduce flow through orifice 21 and thereby to increase the pressure in chamber 17. Torque motor 26 is energised by an increase in the current supplied thereto to overcome spring 25 and reduce flow through orifice 21.

A stem 27 is freely slidable in the body 10 and is urged into engagement with the head 16 of piston member 12 by a spring 28 which is engaged between a flange 29 of stem 27 and the control member 24. Control member 24 carries a sealing element 30 which can shut off orifice 22 completely when control member 24 is in its fully anti-clockwise position, as viewed in the drawing.

In use, an increase in the supply current to torque motor 26 causes control member 24 to move clockwise against spring 25, increasing the servo-pressure in chamber 17 and urging piston member downwardly against spring 18 to increase fluid flow through the valve. Downward movement of piston member 12 reduces the force applied by spring 28 to control member 24, allowing the latter to move slightly anti-clockwise until an equilibrium position is reached. Spring 28 thus provides a feed back force proportional to the position of piston member 12. A decrease in supply current to torque motor 26 similarly decreases fluid flow through the valve.

In the event that supply current to the torque motor 26 fails completely, or the torque motor itself fails in such a way that it applies no torque to control member 24, member 24 is moved under the influence of spring 25 to shut orifice 22 completely. Fluid within chamber 23 remains locked therein and acts to resist movement of piston member 12 in either direction.

I claim:

1. A servo-pressure operated piston arrangement comprising a piston member slidable within a cylinder in response to variations in a servo-pressure signal, a pilot valve for controlling said servo-pressure signal, said pilot valve comprising a torque motor, a first orifice, a control member movable by said torque motor to vary fluid flow through said first orifice, first biasing means urging said control member against movement by said torque motor, and a second orifice, said second orifice communicating with a chamber defined, in part, by opposing axially - directed faces on said piston member and said cylinder, said first biasing means urging said control member in a direction to shut said second orifice.

2. An arrangement as claimed in claim 1 in which said first biasing means urges said control member in a direction to open said first orifice.

3. An arrangement as claimed in claim 1 which includes second biasing means for opposing movement of said piston member in response to an increase in said servo-pressure signal.

4. An arrangement as claimed in claim 3 in which said second biasing means comprises a spring engaged between an end face of said piston member and an opposed face of said cylinder.

5. An arrangement as claimed in claim 4 in which said chamber is defined by said piston end face and said opposed face of the cylinder.

6. An arrangement as claimed in claim 1 which includes means, responsive to movement of said piston member, for urging said control member to vary said servo-pressure signal in a sense which opposes said piston member movement.

7. An arrangement as claimed in claim 1 in which said piston member forms a control element of a fluid flow control valve.

* * * * *